United States Patent [19]

Uehara

[11] Patent Number: 4,609,011

[45] Date of Patent: Sep. 2, 1986

[54] FLOW CONTROL VALVE

[75] Inventor: Tadayoshi Uehara, Sagamihara, Japan

[73] Assignee: Aida Engineering, Ltd., Kanagawa, Japan

[21] Appl. No.: 729,629

[22] Filed: May 2, 1985

[30] Foreign Application Priority Data

Jun. 14, 1984 [JP] Japan ............................... 59-122588

[51] Int. Cl.[4] ............................................... F16K 21/00

[52] U.S. Cl. ............................... 137/624.15; 137/601; 137/624.2

[58] Field of Search ................. 137/601, 624.15, 624.2

[56] References Cited

U.S. PATENT DOCUMENTS 3,490,337 1/1970 Klein ........................... 137/624.2 X 3,872,876 3/1975 Bachman .................... 137/624.15 X 4,281,584 8/1981 Onken et al. ..................... 91/459 X

*Primary Examiner*—Gerald A. Michalsky

*Attorney, Agent, or Firm*—Holman & Stern

[57] ABSTRACT

A new flow control valve comprises valve openings, having valve seats opened and closed by poppets, provided in fluid passages extending from an inlet port to an outlet port in the valve body, and a control mechanism to produce a changeover of pilot pressure and a setting of time lag in response to a pulse signal of variable frequency from a pulse oscillator provided for a pilot control section, the openings at the valve seats being opened and closed through the control of the frequency as well as the setting of the time lag, so that a flux of the fluid can be controlled exactly.

7 Claims, 2 Drawing Figures

FLOW CONTROL VALVE

BACKGROUND OF THE INVENTION

1. Field of the Invention

The present invention relates to a flow control valve, and more particularly, to a new flow control valve designed to control a flux of the fluid in response to the frequency of an input pulse.

2. Description of the Prior Art

Flow control valves designed to control a flux of the fluid in response to an electric signal have heretofore been known. However, such conventional types of flow control valves were generally so constructed that initially a sawtooth-wave-form pulse signal and a variable reference level pulse signal are both sent to a comparator circuit and then the valve is opened when the level of said sawtooth-wave-form pulse signal is larger than that of a reference level pulse signal. That is, these types of flow control valves are generally to control the flux of fluid by a so-called pulse width modulation system.

Consequently, in such conventional flow control valves, an electric circuit was especially sophisticated, while their responsive performances and controllable accuracies were not always satisfactory for users because of structural limitations of the valve body to be used.

SUMMARY OF THE INVENTION

The present invention provides an entirely new flow control valve designed to exactly control the flux of fluid in response to the pulse frequency.

The flow control valve of the present invention is so designed that valve openings having valve seats opened and closed by respective poppets are provided at common "IN"- and "OUT"-ports of parallel fluid passages between the "IN"-port and "OUT"-port and each poppet which opens and closes each valve seat is actuated by differential pressure of pressurized fluid applied to pressure chambers in which the poppets operate arranged opposite to each other. A poppet is actuated by the pressure in the respective pressure chamber of the "IN"-port side to open a corresponding valve seat according to a timing synchronized with a pulse signal of variable frequency sent from a pulse oscillator and, the corresponding poppet is also actuated by the pressure in its respective pressure chamber at the "OUT"-port side to close a corresponding valve seat in accordance with a timing just at that time when the predetermined time has lapsed and, the flow from "IN"-port to "OUT"-port can thereby be controlled exactly by controlling a frequency of the pulse signal.

BRIEF DESCRIPTION OF THE DRAWINGS

The invention will now be described in detail with reference to the accompanying drawings wherein.

DETAILED DESCRIPTION

Figure 1:
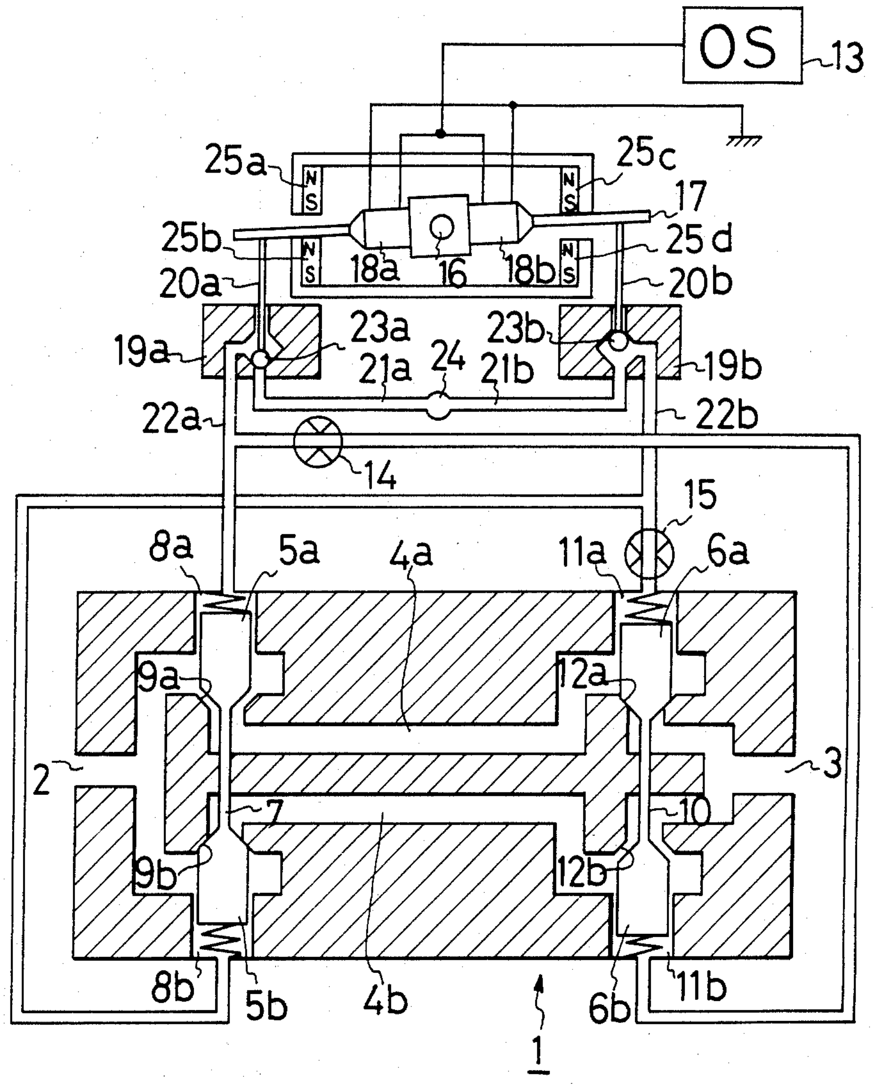
FIG. 1 is a schematic diagram of the mechanism showing, partly in cross-section, an embodiment of the present invention.

Initially, referring to FIG. 1, which shows a diagram of an ideal embodiment of the present invention, a pair of fluid passages 4*a* and 4*b* are arranged parallel to each other between "IN"-port 2 and "OUT"-port 3 of the valve body 1.

A valve opening having valve seat 9*a* located in the flow passage extending from "IN"-port 2 to the fluid passage 4*a* is opened or closed by a poppet 5*a* and a valve opening having valve seat 9*b* located in the flow passage extending from "IN"-port 2 to the passage 4*b* is opened or closed by a poppet 5*b*. Also, a valve opening having valve seat 12*a* located in the flow passage extending from the passage 4*a* to "OUT"-port 3 is opened or closed by a poppet 6*a* and a valve opening having valve seat 12*b* located in the flow passage extending from the passage 4*b* to "OUT"-port 3 is opened or closed by a poppet 6*b*.

Poppets 5*a* and 5*b* are linked together by a pin 7 and float inside pressure chambers 8*a* and 8*b*, respectively, arranged opposite to each other, i.e. on opposite sides of parallel passages 4*a*, 4*b* in valve body 1, so that differential pressure between chambers 8*a* and 8*b* will act on the respective poppets to open the valve seat 9*b* by moving the poppet 5*b* off its valve seat when the poppet 5*a* is operated to close the valve seat 9*a*, and also to open the valve seat 9*a* by moving the poppet 5*a* off its valve seat when the poppet 5*b* is operated to close the valve seat 9*b*. Accordingly, simultaneous opening and closing of valve seats 9*a* and 9*b* is avoided.

In the same way, poppets 6*a* and 6*b* are linked by pin 10 and float inside pressure chambers 11*a* and 11*b*, respectively arranged opposite to each other, i.e. on opposite sides of parallel passages 4*a*, 4*b* in valve body 1, so that, differential pressure between chambers 11*a* and 11*b* will act on the respective poppets to open the valve seat 12*b* by moving the poppet 6*b* off its valve seat when the poppet 6*a* is operated to close the valve seat 12*a* and also to open the valve seat 12*a* by moving the poppet 6*a* off its valve seat when the poppet 6*b* is operated to close the valve seat 12*b*. Consequently, opening and closing of both of the valve seats 12*a* and 12*b* simultaneously is avoided.

Accordingly, if a pilot pressure is applied to the pressure chambers 8*b* and 11*a* and the openings at valve seats 9*b* and 12*a* are both closed, and further the pilot pressure is applied to the pressure chamber 8*a* in response to a pulse signal reflected on a certain polarity at a state where the valve seats 9*a* and 12*b* are opened and then the pilot pressure is applied to the pressure chamber 11*b* after a predetermined time lag, an operating oil will flow from "IN"-port 2 to "OUT"-port 3 through the passage 4*b* for a period of time until the opening at valve seat 12*b* is closed after the opening at valve seat 9*b* has been opened.

In the same way, if the pilot pressure is applied to the pressure chambers 8*a* and 11*b* and the openings at valve seats 9*a* and 12*b* are both closed, and further the pilot pressure is applied to the pressure chamber 8*b* in response to a pulse signal reflected on another polarity at a state where the openings at valve seats 9*b* and 12*a* are opened and then the pilot pressure is applied to the pressure chamber 11*a* after a predetermined time lag, the operating oil will flow from "IN"-port 2 to "OUT"-port 3 through the passage 4*a* for a period of time until the opening at valve seat 12*a* is closed after the opening at valve seat 9*a* has been opened.

Accordingly, the present invention is so contrived that a changeover between the supply of pilot pressure to the pressure chambers 8*a* and 11*b* and the supply of pilot pressure to the pressure chambers 8*b* and 11*a* is carried out correspondingly with a polar inversion of the pulse emitted from a pulse oscillator 13 generating a variable frequency and also a time lag until the pilot pressure is supplied to the pressure chamber 11*b* after the pilot pressure has been supplied to the pressure chamber 8*a* is set by a diametral control of the orifice 14 and in addition a time lag until the pilot pressure is supplied to the pressure chamber 11*a* after the pilot pressure has been supplied to the pressure chamber 8*b* is set by a diametral control of the orifice 15 and thereby the flux flowing from "IN"-port 2 to "OUT"-port 3 can be controlled by the frequency of the pulse signal emitted from the pulse oscillator 13.

Therefore, the present invention will now be described for a mechanism and its composition for carrying out a changeover of the pilot pressure and a setting of the time lag.

Initially, referring to FIG. 1, a drive pin 17 is illustrated therein, which is, e.g., made of a ferromagnetic body with a low residual magnetism such as a soft iron and is pivotably supported at its central portion to be freely oscillatable by a pin 16 mounted on the valve body 1. A pair of coils 18*a* and 18*b* are wound on drive pin 17. One end of each of these coils 18*a* and 18*b* is OR-connected and led to the ground and the other end of each coil is also OR-connected and led to an output of the pulse oscillator 13.

Incidentally, the coils 18*a* and 18*b* are so wound on the drive pin 17 that, when the output of the pulse oscillator 13 is positive, the left end of drive pin 17 is an "N"-pole and the right end of the same is an "S"-pole and also, when the output of the pulse oscillator 13 is negative, the left end of the drive pin 17 is an "S"-pole and the right end of the same is an "N"-pole.

In this connection, the numeric numbers 19*a* and 19*b* in FIG. 1 each denote a pilot valve fixed to the valve body 1. Into these pilot valves 19*a* and 19*b*, reciprocating pins 20*a* and 20*b* are inserted to be freely ascendable and descendable and the top ends of pins 20*a* and 20*b* reach respectively the left and right end portions of drive pin 17.

The pilot valve 19*a* is to open or shut off the passage between pressure lines 21*a* and 22*a*. When the pin 20*a* is actuated to push down a sphere 23*a* against the pilot pressure, the passage between pressure lines 21*a* and 22*a* will be shut off. On the other hand, when the sphere 23*a* is pushed up by the pilot pressure, the passage between pressure lines 21*a* and 22*a* will be open. The pilot pressure sent through the pilot valve 19*a* is supplied to the pressure chamber 8*a* through the pressure line 22*a* and then to the pressure chamber 11*b* after a time lag determined by the diametral control of the orifice 14 has lapsed.

The pilot valve 19*b* is to open or shut off the passage between pressure lines 21*b* and 22*b*. When the pin 20*b* is actuated to push down the sphere 23*b* against the pilot pressure, the passage between pressure lines 21*b* and 22*b* will be shut off. On the other hand, when the sphere 23*b* is pushed up by the pilot pressure, the passage between pressure lines 21*b* and 22*b* will be open. The pilot pressure sent through the pilot valve 19*b* is supplied to the pressure chamber 8*b* through the pressure line 22*b* and then to the pressure chamber 11*a* after lapse of the time lag determined by the diametral control of the orifice 15.

The numeric number 24 shows a pilot pressure source, and four permanent magnets 25*a*, 25*b*, 25*c* and 25*d* are arranged facing their different poles respectively inwards on and under both ends of the drive pin 17.

Figure 2:
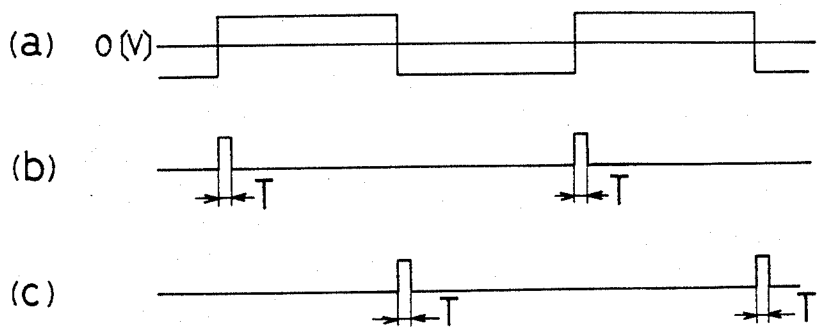
FIG. 2 is an operational timing chart of the embodiment shown in FIG. 1.

The operation of the present invention will now be described as an action of the embodiment of FIG. 1 by reference to a timing chart of FIG. 2. In FIG. 2, the graph (a) shows a pattern of the pulse signal generated by the pulse oscillator 13, the graph (b) shows a pattern of the time "T" in which the operating oil passes through the fluid passage 4*b* and the graph (c) shows a pattern of the time "T" in which the operating oil passes through the fluid passage 4*a* respectively.

Now, let it be supposed that a polarity of the pulse generated by the pulse oscillator 13 is negative at its initial stage, as shown in FIG. 2(*a*).

As has been noted previously, when the output polarity of the pulse oscillator 13 is negative, the left end of the drive pin 17 is an "S"-pole and the right end of the same is "N"-pole. Consequently, the drive pin 17 will naturally turn counterclockwise about the pivot pin 16 since its left end will be attracted to the permanent magnet 25*b* and its right end to the magnet 25*c*.

Accordingly, in the initial stage, as shown in FIG. 1, the pin 20*a* acts to push down the sphere 23*a* against the pilot pressure, so that the passage between pressure lines 21*a* and 22*b* is open, the pilot pressure will be supplied to the pressure chambers 8*b* and 11*a* of the valve body 1. Therefore, in the initial stage, as shown in FIG. 1, the poppet 5*a* acts to open the opening at valve seat 9*a*, but the poppet 6*a* acts to close the opening at valve seat 12*a*, so that the operating oil cannot flow from "IN"-port 2 to "OUT"-port 3 through the fluid passage 4*a*. Also, the poppet 6*b* acts to open the opening at valve seat 12*b* but the poppet 5*b* acts to close the opening at valve seat 9*b*, so that the operating oil cannot flow from "IN"-port 2 to "OUT"-port 3 though the fluid passage 4*b*.

Therefore, in this state, the fluid passages between "IN"-port 2 and "OUT"-port 3 are shut off.

In this state, when a polarity of the pulse generated by the pulse oscillator 13 is reversed and turns positive, a polarity at each end of the drive pin 17 is also reversed and its left end turns to an "N"-pole and its right end to an "S"-pole, so that the left end is attracted to the permanent magnet 25*a* and the right end to magnet 25*d*, respectively.

Consequently, as the pin 20*b* acts to push down the sphere 23*b* against the pilot pressure, the passage between pressure lines 21*b* and 22*b* will be shut off, and pilot pressure cannot be supplied to the pressure chambers 8*b* and 11*a*. At the same time, as the sphere 23*b* is pushed down by the action of the pin 20*b*, the sphere 23*a* is pushed up by the pilot pressure and the passage between pressure lines 21*a* and 22*a* will be opened.

Thus, when the passage between pressure lines 21*a* and 22*a* is open, the pilot pressure is supplied to the pressure chamber 8*a* and then to pressure chamber 11*b* after the time lag "T" set by the diametral control of the orifice 14 has lapsed.

Now, when the pilot pressure is applied to the pressure chamber 8*a*, the opening at valve seat 9*a* will be closed and at the same time the opening of valve seat 9*b* will be opened. As the valve seat 12*b* is open until the time lag "T" set by the diametral control of the orifice 14 lapses, the operating oil will flow from "IN"-port 2 to "OUT"-port 3 through the fluid passage 4*b* within the range of time "T" shown in FIG. 2(*b*). The valve seat 12*b* is then closed by the pilot pressure applied to the pressure chamber 11*b* after the time "T" set by the diametral control of the orifice 14 has lapsed, so that the operating oil flowing through the fluid passage 4*b* ceases its flow completely. After this, until the polarity of the pulse generated by the pulse oscillator 13 is reversed, the poppets 5*a* and 6*b* act to close the openings at valve seats 9*a* and 12*b* and at the same time the poppets 5*b* and 6*a* continue to act to open the openings at valve seats 9*b* and 12*a*, respectively.

Next, in the state where the pilot pressure is thus applied to the pressure chambers 8*a* and 11*b*, if polarity of the pulse generated by the pulse oscillator 13 is reversed and turns to negative, the left end of the drive pin 17 will be an "S"-pole and the right end of the same will be an "N"-pole so that the left end of the drive pin 17 is attracted to the permanent magnet 25*b* and its right end to the magnet 25*c*, respectively.

Accordingly, the pin 20*a* works to push down the sphere 23*a* against the pilot pressure, so that the passage between pressure lines 21*a* and 22*a* is shut off and in consequence the pilot pressure cannot be applied to both of the pressure chambers 8*a* and 11*b*. At the same time as the sphere 23*a* is pushed down by the action of the pin 20*a*, the sphere 23*b* is pushed up by the pilot pressure and the passage between pressure lines 21*b* and 22*b* is open so that the pilot pressure will be applied to the pressure chamber 8*b* and then to the pressure chamber 11*a* after the time lag "T" set by the diametral control of the orifice 15 has lapsed.

When the pilot pressure is applied to the pressure chamber 8*b*, the opening at valve seat 9*b* will be shut off, and at the same time the opening at valve seat 9*a* will be opened. As the opening at valve seat 12*a* continues to be open until the time "T" set by the diametral control of the orifice 15 lapses, the operating oil flows from "IN"-port 2 to "OUT"-port 3 through the fluid passage 4*a* within the range of the time "T" shown in FIG. 2(*c*).

When the time "T" set by the diametral control of the orifice 15 lapses, the pilot pressure will be applied to the pressure chamber 11*a* and the opening at valve seat 12*a* will thereby be closed and in consequence the flow of the operating oil through the fluid passage 4*a* ceases completely. Until a polarity of the pulse generated by the pulse oscillator 13 is then reversed, the poppets 5*b* and 6*a* work to close the openings at valve seats 9*b* and 12*a*, respectively, and also the poppets 5*a* and 6*b* continue their operation to open the openings at valve seats 9*a* and 12*b*.

In this way, the present embodiment is so contrived that, when the polarity of the pulse generated by the pulse oscillator 13 is reversed from negative to positive, the operating oil flows through the fluid passage 4*b* until a very short time "T" set by the diametral control of the orifice 14 lapses as shown in FIG. 2(*b*), and also when the polarity of the pulse generated by the pulse oscillator 13 is reversed from positive to negative, the operating oil flows through the fluid passage 4*a* until a very short time "T" set by the diametral control of the orifice 15 lapses. Namely, the operating oil flows only for a period of the time "T" whenever a polarity of the pulse is reversed.

A flux per pulse of the operating oil flowing from "IN"-port 2 to "OUT"-port 3 is determined in proportion to the length of the very short time "T" during which the fluid passage 4*a* or 4*b* is open, and said very short time "T" is set by the diametral control of the orifices 14 and 15. Accordingly, if the aforesaid time lag "T" is preset by controlling a diameter of the orifices 14 and 15, the flux per one pulse of the operating oil flowing from "IN"-port 2 to "OUT"-port 3 can be determined uniformly.

As a flux per unit time (e.g., 1 second) of the operating oil flowing from "IN"-port 2 to "OUT"-port 3 is given by a value which is obtained by multiplying the flux per pulse of the operating oil by the number of pulses per unit time (e.g., 1 second), if a frequency of the pulse generated by the pulse oscillator 13 is controlled by a time constant of oscillator 13, the flux per unit time (e.g., 1 second) will be possible to be controlled exactly.

In the aforementioned embodiment, an example wherein the fluid passages 4*a* and 4*b* are arranged in parallel to each other and the operating oil is displaced in both cases when the polarity of the pulse is reversed from positive to negative and vice versa is shown. However, the flux control can be accomplished by controlling the pulse frequence even if either of the fluid passages 4*a* and 4*b* is omitted. In this case, the operating oil flows in accordance with the timing in either case where polarity of the pulse is reversed from positive to negative and vice versa.

Also, in the aforementioned embodiment, an example wherein the pins 20*a* and 20*b* are raised or lowered through the oscillation of member 17 about pivot pin 16 and a changeover of the pilot pressure is performed is shown. However, it is possible to reciprocate the pins 20*a* and 20*b* by the use of, for example, separate and independent solenoids.

Moreover, in the above-noted embodiment, there is shown an example wherein the time lag "T" from the moment when the pilot pressure is applied to the pressure chamber 8*a* or 8*b* to the moment when the pilot pressure is applied to the pressure chamber 11*b* or 11*a*, respectively, is set by the diametral control of the orifices 14 and 15. However, any method may be used, provided that the time lag "T" from the moment when the pilot pressure is applied to the pressure chamber 8*a* or 8*b* to the moment when it is applied to the pressure chamber 11*b* or 11*a*, respectively, can be set exactly. For instance, it is also possible to electrically set the time lag in an electric circuit by controlling the charge time of a condenser, or the like.

Furthermore, in the foregoing embodiment, there is shown an example wherein the pilot pressure obtained from a single pilot pressure source through the changeover between pilot valves 19*a* and 19*b* is supplied to either of the pressure chambers 8*a* and 11*b*, or 8*b* and 11*a*. However, it is also possible to use an independent pilot pressure source provided for each of the pilot valves 19*a* and 19*b*, or for each of the pressure chambers 8*a* and 8*b* and 11*a* and 11*b* and the time lag "T" is contrived to be set by a delay circuit in which "CR" or the like is built.

Yet further, it will easily be understood from the foregoing embodiment that an ideal control characteristic can be obtained by adjusting not only a frequency of the pulse oscillator but also an output voltage of the same or by diametral adjustment of the orifices.

As will be understood from the above, according to the present invention, an accurate flow control can be attained by controlling the pulse frequency. And, as a leakage of the operating oil can completely be prevented through the engagement of a poppet with a valve seat, the flux per pulse can exactly be controlled. Thus, the present invention makes it needless to use a highly mechanized control technique such as a flux feedback or similar means, and also makes it possible to simplify the control mechanism to the full extent.

Moreover, as it is possible to arrest a so-called reaction force exactly through the engagement of a poppet with a valve seat, the present flow control valve can display its function most satisfactorily as a drive means for equipment having a large reaction force.

I claim:

1. A flow control valve comprising:
- a valve body;
- an inlet port in said valve body;
- an outlet port in said valve body;
- two parallel fluid flow passages each extending between and communicating at each end with said inlet and outlet ports;
- a first valve opening adjacent the end of each passage near said inlet port;
- a second valve opening adjacent the end of each passage near said outlet port;
- a valve seat in each of said valve openings;
- a first pressure chamber in said valve body adjacent each first valve opening;
- a second pressure chamber in said valve body adjacent each second valve opening;
- first and second poppets slidably mounted in said first and second presure chambers, respectively, for engagement and disengagement with the valve seats of said first and second openings for closing and opening said openings, respectively;
- said first poppets being simultaneously movable so that movement of one of said first poppets into closing engagement with the respective valve seat moves the other of said first poppets into a disengaged position with the respective valve seat;
- said second poppets being simultaneously movable so that movement of one of said second poppets into closing engagement with the respective valve seat moves the other of said second poppets into a disengaged position with the respective valve seat;
- means to apply fluid pressure from a fluid pressure source to said pressure chambers to selectively actuate said poppets therein;
- means to produce a pulse signal of variable frequency; and
- fluid pressure control means operatively associated with said pulse signal means to control the fluid pressure applied to said first pressure chambers selectively in accordance with a timing synchronized with said pulse signal and to said second pressure chambers selectively after a predetermined time delay for opening and closing said valve openings to allow intermittent flow through said passages for predetermined time periods controlled by said means to produce a pulse signal.

2. A flow control valve as claimed in claim 1 and further comprising:
- a first valve stem interconnecting said first poppets; and
- a second valve stem interconnecting said second poppets.

3. A flow control valve as claimed in claim 1 wherein said fluid pressure control means comprises:
- first and second pilot valve means;
- a fluid pressure inlet for each pilot valve means operatively connected to a fluid pressure source;
- a fluid pressure outlet for each pilot valve means;
- first fluid pressure conduit means connecting said outlet of said first pilot valve means with one of said first pressure chambers and one of said second pressure chambers; and
- second fluid pressure conduit means connecting said second pilot valve means with the other of said first pressure chamber and second pressure chamber.

4. A flow control valve as claimed in claim 3 and further comprising:
- a first variable orifice means in said first conduit means leading to said one second pressure chamber; and
- a second variable orifice means in said second conduit means leading to said other second pressure chamber;
- so that said variable orifice means control said predetermined time delay.

5. A flow control valve as claimed in claim 4 and further comprising:
- a first valve stem interconnecting said second poppets; and
- a second valve stem interconnecting said second poppets.

6. A flow control valve as claimed in claim 4 wherein:
- said fluid pressure control means further comprises electrically controlled operator means operatively associated with said pilot valve means for operating said pilot valve means to simultaneously open one and close the other of said pilot valve means; and
- said means to produce a pulse signal comprises an electrical pulse emitter operatively connected to said electrically controlled operator means for operating said pilot valves in response to said electrical pulses.

7. A flow control valve as claimed in claim 6 and further comprising:
- a first valve stem interconnecting said first poppets; and
- a second valve stem interconnecting said second poppets.

* * * * *